US006963479B2

(12) United States Patent
Krichtafovitch

(10) Patent No.: US 6,963,479 B2
(45) Date of Patent: Nov. 8, 2005

(54) METHOD OF AND APPARATUS FOR ELECTROSTATIC FLUID ACCELERATION CONTROL OF A FLUID FLOW

(75) Inventor: Igor A. Krichtafovitch, Kirkland, WA (US)

(73) Assignee: Kronos Advanced Technologies, Inc., Belmont, MA (US)

( * ) Notice: Subject to any disclaimer, the term of this patent is extended or adjusted under 35 U.S.C. 154(b) by 68 days.

(21) Appl. No.: 10/735,302

(22) Filed: Dec. 15, 2003

(65) Prior Publication Data

US 2004/0183454 A1 Sep. 23, 2004

Related U.S. Application Data

(63) Continuation-in-part of application No. 10/175,947, filed on Jun. 21, 2002, now Pat. No. 6,664,741.

(51) Int. Cl.[7] .................................................. H01G 3/00
(52) U.S. Cl. ....................... 361/226; 361/225; 361/229; 250/324; 250/325
(58) Field of Search ................................. 361/225, 226, 361/229, 230, 235, 212, 213; 250/324, 325, 326

(56) References Cited

U.S. PATENT DOCUMENTS

| | | | |
|---|---|---|---|
| 1,888,606 | A | 11/1932 | Nesbit |
| 2,590,447 | A | 3/1952 | Nord, Jr. et al. |
| 2,765,975 | A | 10/1956 | Lindenblad |
| 2,949,550 | A | 8/1960 | Brown |
| 3,026,964 | A | 3/1962 | Penney |
| 3,071,705 | A | 1/1963 | Coleman et al. |
| 3,108,394 | A | 10/1963 | Ellman et al. |
| 3,198,726 | A | 8/1965 | Trikilis |
| 3,267,860 | A | 8/1966 | Brown |
| 3,374,941 | A | 3/1968 | Okress |
| 3,518,462 | A | 6/1970 | Brown |
| 3,582,694 | A | 6/1971 | Gourdine |
| 3,638,058 | A | 1/1972 | Fritzius |
| 3,675,096 | A | 7/1972 | Kiess |
| 3,699,387 | A | 10/1972 | Edwards |
| 3,740,927 | A | 6/1973 | Vincent |
| 3,751,715 | A | 8/1973 | Edwards |

(Continued)

OTHER PUBLICATIONS

Request for Ex Parte Reexamination under 37 C.F.R. 1.510; U.S. Appl. No. 90/007,276, filed on Oct. 29, 2004.
Manual on Current Mode PWM Controller LinFinity Microelectronics (SG1842/SG1843 Series, Apr. 2000).
Product Catalog of GE–Ding Information Inc. (From Website—www.reedsensor.com.tw).

*Primary Examiner*—Tuyet Thi Vo
(74) *Attorney, Agent, or Firm*—Fulbright & Jaworski LLP

(57) ABSTRACT

A device for handling a fluid includes a corona discharge device and an electric power supply. The corona discharge device includes at least one corona discharge electrode and at least one collector electrode positioned proximate each other so as to provide a total inter-electrode capacitance within a predetermined range. The electric power supply is connected to supply an electric power signal to said corona discharge and collector electrodes so as to cause a corona current to flow between the corona discharge and collector electrodes. An amplitude of an alternating component of the voltage of the electric power signal generated is no greater than one-tenth that of an amplitude of a constant component of the voltage of the electric power signal. The alternating component of the voltage is of such amplitude and frequency that a ratio of an amplitude of the alternating component of the highest harmonic of the voltage divided by an amplitude of the constant component of said voltage being considerably less than that of a ratio of an amplitude of the highest harmonic of the alternating component of the corona current divided by an amplitude of the constant component of the corona current, i.e., $(V_{ac}/V_{dc}) \leqq (I_{ac}/I_{dc})$.

45 Claims, 2 Drawing Sheets

U.S. PATENT DOCUMENTS 3,892,927 A 7/1975 Lindenberg
3,896,347 A 7/1975 Gelfand
3,907,520 A 9/1975 Huang et al.
3,918,939 A 11/1975 Hardt
3,936,635 A 2/1976 Clark
3,981,695 A 9/1976 Fuchs
3,983,393 A 9/1976 Thettu et al.
3,984,215 A 10/1976 Zucker
4,008,057 A 2/1977 Gelfand et al.
4,011,719 A 3/1977 Banks
4,061,961 A 12/1977 Baker
4,086,152 A 4/1978 Rich et al.
4,086,650 A 4/1978 Davis et al.
4,124,003 A 11/1978 Abe et al.
4,126,434 A 11/1978 Keiichi
4,156,885 A 5/1979 Baker et al.
4,162,144 A 7/1979 Cheney
4,210,847 A 7/1980 Shannon et al.
4,216,000 A 8/1980 Kofoid
4,231,766 A 11/1980 Spurgin
4,232,355 A 11/1980 Finger et al.
4,240,809 A 12/1980 Elsbernd et al.
RE30,480 E 1/1981 Gelfand
4,246,010 A 1/1981 Honacker
4,259,707 A 3/1981 Penney
4,266,948 A 5/1981 Teague et al.
4,267,502 A 5/1981 Reese et al.
4,292,493 A 9/1981 Selander et al.
4,313,741 A 2/1982 Masuda et al.
4,315,837 A 2/1982 Rourke et al.
4,335,414 A 6/1982 Weber
4,351,648 A 9/1982 Penney
4,369,776 A 1/1983 Roberts
4,376,637 A 3/1983 Yang
4,379,129 A 4/1983 Abe
4,380,720 A 4/1983 Fleck
4,388,274 A 6/1983 Rourke et al.
4,390,831 A 6/1983 Byrd et al.
4,401,385 A 8/1983 Katayama et al.
4,477,268 A 10/1984 Kalt
4,481,017 A 11/1984 Furlong
4,496,375 A 1/1985 Le Vantine
4,567,541 A 1/1986 Terai
4,600,411 A 7/1986 Santamaria
4,604,112 A 8/1986 Ciliberti et al.
4,632,135 A 12/1986 Lenting et al.
4,643,745 A 2/1987 Sakakibara et al.
4,646,196 A 2/1987 Reale
4,649,703 A 3/1987 Dettling et al.
4,673,416 A 6/1987 Sakakibara et al.
4,689,056 A 8/1987 Noguchi et al.
4,713,724 A 12/1987 Voelkel
4,719,535 A 1/1988 Zhenjun et al.
4,740,862 A 4/1988 Halleck
4,741,746 A 5/1988 Chao et al.
4,775,915 A 10/1988 Walgrove, III
4,783,595 A 11/1988 Seidl
4,789,801 A 12/1988 Lee
4,790,861 A 12/1988 Watai et al.
4,811,159 A 3/1989 Foster, Jr.
4,812,711 A 3/1989 Torok et al.
4,837,658 A 6/1989 Reale
4,838,021 A 6/1989 Beattie
4,853,719 A 8/1989 Reale
4,853,735 A 8/1989 Kodama et al.
4,878,149 A 10/1989 Stiehl et al.
4,924,937 A 5/1990 Beal et al.
4,938,786 A 7/1990 Tonomoto
4,941,068 A 7/1990 Hofmann
4,941,353 A 7/1990 Fukatsu et al.
4,980,611 A 12/1990 Orenstein
4,996,473 A 2/1991 Markson et al.
5,012,159 A 4/1991 Torok et al.
5,024,685 A 6/1991 Torok et al.
5,055,118 A 10/1991 Nagoshi et al.
5,059,219 A 10/1991 Plaks et al.
5,072,746 A 12/1991 Kantor
5,077,500 A 12/1991 Torok et al.
5,087,943 A 2/1992 Creveling
5,136,461 A 8/1992 Zellweger
5,138,513 A 8/1992 Weinstein
5,155,531 A 10/1992 Kurotori et al.
5,163,983 A 11/1992 Lee
5,199,257 A 4/1993 Colletta et al.
5,215,558 A 6/1993 Moon
5,245,692 A 9/1993 Kawai
5,257,073 A 10/1993 Gross et al.
5,269,131 A 12/1993 Brophy
5,330,559 A 7/1994 Cheney et al.
5,368,839 A 11/1994 Aime et al.
5,369,953 A 12/1994 Brophy
5,423,902 A 6/1995 Strutz et al.
5,469,242 A 11/1995 Yu et al.
5,474,599 A 12/1995 Cheney et al.
5,484,472 A 1/1996 Weinberg
5,508,880 A 4/1996 Beyer
5,535,089 A 7/1996 Ford et al.
5,556,448 A 9/1996 Cheney et al.
5,569,368 A 10/1996 Larsky et al.
5,578,112 A 11/1996 Krause
5,601,636 A 2/1997 Glucksman
5,642,254 A * 6/1997 Benwood et al. ........... 361/235
5,656,063 A 8/1997 Hsu
5,661,299 A 8/1997 Purser
5,667,564 A 9/1997 Weinberg
5,707,428 A 1/1998 Feldman et al.
5,769,155 A 6/1998 Ohadi et al.
5,779,769 A 7/1998 Jiang
5,814,135 A 9/1998 Weinberg
5,827,407 A 10/1998 Wang et al.
5,847,917 A 12/1998 Suzuki
5,854,742 A 12/1998 Faulk
5,892,363 A 4/1999 Roman
5,894,001 A 4/1999 Hitzler et al.
5,899,666 A 5/1999 Chung et al.
D411,001 S 6/1999 Pinchuk
5,920,474 A 7/1999 Johnson et al.
5,951,957 A 9/1999 Simpson
5,973,905 A 10/1999 Shaw
5,982,102 A 11/1999 Andzej
5,993,521 A 11/1999 Loreth et al.
D420,438 S 2/2000 Pinchuk
6,023,155 A 2/2000 Kalinsky et al.
6,042,637 A 3/2000 Weinberg
6,056,808 A 5/2000 Krause
D427,300 S 6/2000 Pinchuk
6,084,350 A 7/2000 Ezaki et al.
6,108,504 A 8/2000 Dickhoff
6,125,636 A 10/2000 Taylor et al.
D433,494 S 11/2000 Pinchuk et al.
D434,483 S 11/2000 Pinchuk
6,145,298 A 11/2000 Burton
6,152,146 A 11/2000 Taylor et al.
6,163,098 A 12/2000 Taylor et al.
6,167,196 A 12/2000 Huggins et al.
6,176,977 B1 1/2001 Taylor et al.
6,182,671 B1 2/2001 Taylor et al.
D438,513 S 3/2001 Pinchuk
6,195,827 B1 3/2001 Dumitriu
6,200,539 B1 3/2001 Sherman et al.
6,203,600 B1 3/2001 Loreth D440,290 S 4/2001 Pinchuk
6,210,642 B1 4/2001 Lee et al.
6,228,330 B1 5/2001 Herrmann et al.
6,245,126 B1 6/2001 Feldman et al.
6,245,132 B1 6/2001 Feldman et al.
6,312,507 B1 11/2001 Taylor et al.
6,313,064 B1 11/2001 Miyafuji et al.
6,350,417 B1 2/2002 Lau et al.
6,394,086 B1 5/2002 Barnes et al.
6,574,123 B2 6/2003 Wiser et al.
6,603,268 B2 8/2003 Lee
6,664,741 B1 12/2003 Krichtafovitch
2001/0004046 A1 6/2001 Taylor et al.
2001/0032544 A1 10/2001 Taylor et al.
2001/0048906 A1 12/2001 Lau et al.
2002/0079212 A1 6/2002 Taylor et al.
2002/0098131 A1 7/2002 Taylor et al.
2002/0122751 A1 9/2002 Sinaiko et al.
2002/0122752 A1 9/2002 Taylor et al.
2002/0127156 A1 9/2002 Taylor
2002/0141914 A1 10/2002 Lau et al.
2002/0155041 A1 10/2002 McKinney Jr. et al.
2003/0033176 A1 2/2003 Hancock
2003/0147785 A1 8/2003 Joannou
2003/0165410 A1 9/2003 Taylor
2003/0170150 A1 9/2003 Lau et al.
2003/0206837 A1 11/2003 Taylor et al.
2003/0206839 A1 11/2003 Taylor et al.
2003/0206840 A1 11/2003 Taylor et al.
2003/0209420 A1 11/2003 Taylor et al.
2003/0234618 A1 12/2003 Krichtafovitch
2004/0004440 A1 1/2004 Krichtafovitch et al.
2004/0004797 A1 1/2004 Krichtafovitch et al.
2004/0025497 A1 2/2004 Truce
2004/0033340 A1 2/2004 Lau et al.
2004/0047775 A1 3/2004 Lau et al.
2004/0052700 A1 3/2004 Kotlyar et al.
2004/0057882 A1 3/2004 Lau et al.
2004/0079233 A1 4/2004 Lau et al.

* cited by examiner

METHOD OF AND APPARATUS FOR ELECTROSTATIC FLUID ACCELERATION CONTROL OF A FLUID FLOW

RELATED APPLICATIONS

The instant application is a continuation-in-part (CIP) of U.S. patent application Ser. No. 10/175,947 filed Jun. 21, 2002, now U.S. Pat. No. 6,664,741 issued Dec. 16, 2003 and is related to U.S. patent application Ser. No. 09/419,720 filed Oct. 14, 1999, now U.S. Pat. No. 6,504,308 issued Jan. 7, 2003 and incorporated herein in its entirety by reference.

BACKGROUND OF THE INVENTION

1. Field of the Invention

The invention relates to electrical corona discharge devices and in particular to methods of and devices for fluid acceleration to provide velocity and momentum to a fluid, especially to air, through the use of ions and electrical fields.

2. Description of the Related Art

The prior art as described in a number of patents (see, e.g., U.S. Pat. Nos. 4,210,847 of Spurgin and 4,231,766 of Shannon, et al.) has recognized that the corona discharge device may be used to generate ions and accelerate fluids. Such methods are widely used in electrostatic precipitators and electric wind machines as described in *Applied Electrostatic Precipitation* published by Chapman & Hall (1997). The corona discharge device may be generated by application of a high voltage to pairs of electrodes, e.g., a corona discharge electrode and an attractor electrode. The electrodes should be configured and arranged to produce a non-uniform electric field generation, the corona electrodes typically having sharp edges or otherwise being small in size.

To start and sustain the corona discharge device, high voltage should be applied between the pair of electrodes, e.g., the corona discharge electrode and a nearby attractor (also termed collector) electrode. At least one electrode, i.e., the corona discharge electrode, should be physically small or include sharp points or edges to provide a suitable electric field gradient in the vicinity of the electrode. There are several known configurations used to apply voltage between the electrodes to efficiently generate the requisite electric field for ion production. U.S. Pat. No. 4,789,801 of Lee and U.S. Pat. Nos. 6,152,146 and 6,176,977 of Taylor, et al., describe applying a pulsed voltage waveform across pairs of the electrodes, the waveform having a duty cycle between 10% and 100%. These patents describe that such voltage generation decreases ozone generation by the resultant corona discharge device in comparison to application of a steady-state, D.C. power. Regardless of actual benefit of such voltage generation for reducing ozone production, air flow generation is substantially decreased by using a duty cycle less than 100%, while the resultant pulsating air flow is considered unpleasant.

U.S. Pat. No. 6,200,539 of Sherman, et al. describes use of a high frequency high voltage power supply to generate an alternating voltage with a frequency of about 20 kHz. Such high frequency high voltage generation requires a bulky, relatively expensive power supply typically incurring high energy losses. U.S. Pat. No. 5,814,135 of Weinberg describes a high voltage power supply that generates very narrow (i.e., steep, short duration) voltage pulses. Such voltage generation can generate only relatively low volume and rate air flow and is not suitable for the acceleration or movement of high air flows.

All of the above technical solutions focus on specific voltage waveform generation. Accordingly, a need exists for a system for and method of optimizing ion induced fluid acceleration taking into consideration all components and acceleration steps.

SUMMARY OF THE INVENTION

The prior art fails to recognize or appreciate the fact that the ion generation process is more complicated than merely applying a voltage to two electrodes. Instead, the systems and methods of the prior art are generally incapable of producing substantial airflow and, at the same time, limiting ozone production.

Corona related processes have three common aspects. A first aspect is the generation of ions in a fluid media. A second aspect is the charging of fluid molecules and foreign particles by the emitted ions. A third aspect is the acceleration of the charged particles toward an opposite (collector) electrode (i.e., along the electric field lines).

Air or other fluid acceleration that is caused by ions, depends both on quantity (i.e., number) of ions and their ability to induce a charge on nearby fluid particles and therefore propel the fluid particles toward an opposing electrode. At the same time, ozone generation is substantially proportional to the power applied to the electrodes. When ions are introduced into the fluid they tend to attach themselves to the particles and to neutrally-charged fluid molecules. Each particle may accept only a limited amount of charge depending on the size of a particular particle. According to the following formula, the maximum amount of charge (so called saturation charge) may be expressed as:

$$Q_p=\{(1+2\lambda/d_p)^2+[1/(1+2\lambda/d_p)]*[(\in_r-1)/(\in_r+2)]*\pi\in_0 d_p{}^2E,$$

where $d_p$=particle size, $\in_r$ is the dielectric constant of the dielectric material between electrode pairs and $\in_0$ is the dielectric constant in vacuum.

From this equation, it follows that a certain number of ions introduced into the fluid will charge the nearby molecules and ambient particles to some maximum level. This number of ions represents a number of charges flowing from one electrode to another and determines the corona current flowing between the two electrodes.

Once charged, the fluid molecules are attracted to the opposite collector electrode in the direction of the electric field. This directed space over which a force F is exerted, moves molecules having a charge Q which is dependent on the electric field strength E, that is, in turn proportional to the voltage applied to the electrodes:

$$F=-Q*E.$$

If a maximum number of ions are introduced into the fluid by the corona current and the resulting charges are accelerated by the applied voltage alone, a substantial airflow is generated while average power consumption is substantially decreased. This may be implemented by controlling how the corona current changes in value from some minimum value to some maximum value while the voltage between the electrodes is substantially constant. In other words, it has been found to be beneficial to minimize a high voltage ripple (or alternating component) of the power voltage applied to the electrodes (as a proportion of the average high voltage applied) while keeping the current ripples substantially high and ideally comparable to the total mean or RMS amplitude of the current. (Unless otherwise noted or implied by usage, as used herein, the term "ripples" and phrase "alternating component" refer to a time varying component of a signal including all time varying signals waveforms such as sinusoidal, square, sawtooth, irregular, compound, etc., and further including both bi-directional waveforms otherwise known as "alternating current" or "a.c." and unidirectional waveforms such as pulsed direct current or "pulsed d.c.". Further, unless otherwise indicated by context, adjectives such as "small", "large", etc. used in conjunction with such terms including, but not limited to, "ripple", "a.c. component,", "alternating component" etc., describe the relative or absolute amplitude of a particular parameter such as signal potential (or "voltage") and signal rate-of-flow (or "current"). Such distinction between the voltage and current waveforms is possible in the corona related technologies and devices because of the reactive (capacitive) component of the corona generation array of corona and attractor electrodes. The capacitive component results in a relatively low amplitude voltage alternating component producing a relatively large corresponding current alternating component. For example, it is possible in corona discharge devices to use a power supply that generates high voltage with small ripples. These ripples should be of comparatively high frequency "f" (i.e., greater than 1 kHz). The electrodes (i.e., corona electrode and collector electrode) are designed such that their mutual capacitance C is sufficiently high to present a comparatively small impedance $X_c$ when high frequency voltage is applied, as follows:

$$X_c = \frac{1}{2\pi fC}$$

The electrodes represent or may be viewed as a parallel connection of the non-reactive d.c. resistance and reactive a.c. capacitive impedance. Ohmic resistance causes the corona current to flow from one electrode to another. This current amplitude is approximately proportional to the applied voltage amplitude and is substantially constant (d.c.). The capacitive impedance is responsible for the a.c. portion of the current between the electrodes. This portion is proportional to the amplitude of the a.c. component of the applied voltage (the "ripples") and inversely proportional to frequency of the voltage alternating component. Depending on the amplitude of the ripple voltage and its frequency, the amplitude of the a.c. component of the current between the electrodes may be less or greater than the d.c. component of the current.

It has been found that a power supply that is able to generate high voltage with small amplitude ripples (i.e., a filtered d.c. voltage) but provides a current with a relatively large a.c. component (i.e., large amplitude current ripples) across the electrodes provides enhanced ions generation and fluid acceleration while, in case of air, substantially reducing or minimizing ozone production. Thus, the current ripples, expressed as a ratio or fraction defined as the amplitude of an a.c. component of the corona current divided by the amplitude of a d.c. component of the corona current (i.e., $I_{a.c.}/I_{d.c.}$) should be considerably greater (i.e., at least 2 times) than, and preferably at least 10, 100 and, even more preferably, 1000 times as large as the voltage ripples, the latter similarly defined as the amplitude of the time-varying or a.c. component of the voltage applied to the corona discharge electrode divided by the amplitude of the d.c. component (i.e., $V_{a.c.}/V_{d.c.}$).

It has been additionally found that optimal corona discharge device performance is achieved when the output voltage has small amplitude voltage alternating component relative to the average voltage amplitude and the current through the electrodes and intervening dielectric (i.e., fluid to be accelerated) is at least 2, and more preferably 10 times, larger (relative to a d.c. current component) than the voltage alternating component (relative to d.c. voltage) i.e., the a.c./d.c. ratio of the current is much greater by a factor of 2, 10 or even more than a.c./d.c. ratio of the applied voltage. That is, where the electrical power applied to a corona discharge device, such as an electrostatic fluid accelerator, is composed of a constant voltage/current component (e.g., a non-varying-in-time direct current or d.c. component) and a time-varying component (e.g., a pulsed or alternating current (a.c.) component) expressed as whereby $V_t=V_{d.c.}+V_{a.c.}$ and $I_t=I_{d.c.}+I_{a.c.}$, it is preferable to generate a voltage across the corona discharge electrodes such that a resultant current satisfies the following relationships:

$$V_{a.c.} << V_{d.c.} \text{ and } I_{a.c.} \sim I_{d.c.}$$

$$\text{or } V_{a.c.}/V_{d.c.} << I_{a.c.}/I_{d.c.}$$

$$\text{or } V_{a.c.} < V_{d.c.} \text{ and } I_{a.c.} > I_{d.c.}$$

$$\text{or } V_{RMS} = V_{MEAN} \text{ and } I_{RMS} > I_{MEAN}$$

If any of the above requirements are satisfied, then the resultant corona discharge device consumes less power per cubic foot of fluid moved and produces less ozone (in the case of air) compared to a power supply wherein the a.c./d.c. ratios of current and voltage are approximately equal.

To satisfy these requirements, the power supply and the corona generating device should be appropriately designed and configured. In particular, the power supply should generate a high voltage output with only minimal and, at the same time, relatively high frequency ripples. The corona generating device itself should have a predetermined value of designed, stray or parasitic capacitance that provides a substantial high frequency current flow through the electrodes, i.e., from one electrode to another. Should the power supply generate low frequency ripples, then $X_c$ will be relatively large and the amplitude of the alternating component current will not be comparable to the amplitude of the direct current component of the current. Should the power supply generate very small or no ripple, then alternating current will not be comparable to the direct current. Should the corona generating device (i.e., the electrode array) have a low capacitance (including parasitic and/or stray capacitance between the electrodes), then the alternating current again will not be comparable in amplitude to the direct current. If a large resistance is installed between the power supply and the electrode array (see, for example, U.S. Pat. No. 4,789,801 of Lee, FIGS. 1 and 2), then the amplitude of the a.c. current ripples will be dampened (i.e., decreased) and will not be comparable in amplitude to that of the d.c. (i.e., constant) component of the current. Thus, only if certain conditions are satisfied, such that predetermined voltage and current relationships exist, will the corona generating device optimally function to provide sufficient air flow, enhanced operating efficiency, and desirable ozone levels. The resultant power supply is also less costly.

In particular, a power supply that generates ripples does not require substantial output filtering otherwise provided by a relatively expensive and physically large high voltage capacitor connected at the power supply output. This alone makes the power supply less expensive. In addition, such a power supply has less "inertia" i.e., less stored energy tending to dampen amplitude variations in the output and is therefore capable of rapidly changing output voltage than is a high inertia power supply with no or negligible ripples.

DESCRIPTION OF THE PREFERRED EMBODIMENT

Figure 1A:
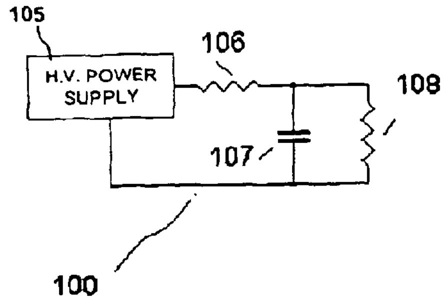
FIG. 1A is a schematic diagram of a power supply that produces a d.c. and d.c.+a.c. current.

FIG. 1A is a block diagram of a power supply suitable to power a corona discharge device consistent with an embodiment of the invention. High voltage power supply (HVPS) 105 generates a power supply voltage 101 (FIG. 1B) of varying amplitude $V_{ac+dc}$. Voltage 101 has superimposed on an average d.c. voltage of $V_{dc}$ an a.c. or alternating component of amplitude $V_{ac}$ having an instantaneous value represented by the distance 103 (i.e., an alternating component of the voltage). A typical average d.c. component of the voltage 101 ($V_{dc}$) is in the range of 10 kV to 25 kV and more preferably equal to 18 kV. The ripple frequency "f" is typically around 100 kHz. It should be noted that low frequency harmonics, such as multiples of the 60 Hz commercial power line frequency including 120 Hz may be present in the voltage wave-form. The following calculation considers only the most significant harmonic, that is the highest harmonic, in this case 100 kHz. The ripples' peak-to-peak amplitude 103 ($V_{ac}$ being the a.c. component of the voltage 101) may be in the range of 0 to 2000 volts peak-to-peak and, more preferably, less than or equal to 900V, with an RMS value of approximately 640V. Voltage 101 is applied to the pair of electrodes (i.e., the corona discharge electrode and the attractor electrode). Resistor 106 represents the internal resistance of HVPS 105 and the resistance of the wires that connect HVPS 105 to the electrodes, this resistance typically having a relatively small value. Capacitor 107 represents the parasitic capacitance between the two electrodes. Note that the value of capacitor 107 is not constant, but may be roughly estimated at the level of about 10 pF.

Resistor 108 represents the non-reactive d.c. ohmic load resistance R characteristic of the air gap between the corona discharge and attractor electrodes. This resistance R depends on the voltage applied, typically having a typical value of 10 mega-Ohms.

The d.c. component from the HVPS 105 flows through resistor 108 while the a.c. component primarily flows through the capacitance 107 representing a substantially lower impedance at the 100 kHz operating range than does resistor 108. In particular, the impedance $X_c$ of capacitor 107 is a function of the ripple frequency. In this case it is approximately equal to:

$$X_c=1/(2\pi f\,C)=1/(2{*}3.14{*}100{,}000{*}10{*}10^{-12})=160\ \text{k}\Omega$$

The a.c. component $I_{a.c.}$ of the current flowing through capacitance 107 is equal to $$I_{a.c.}=V_{a.c.}/X_c=640/160{,}000=0.004\ A=4\ \text{mA}.$$

The d.c. component $I_{dc}$ of the current flowing through the resistor 108 is equal to $$I_{dc}=V_{dc}/R=18\ \text{kV}/10\ \text{M}\Omega=1.8\ \text{mA}.$$

Therefore the a.c. component $I_{ac}$ of the resulting current between the electrodes is about 2.2 times greater than the d.c. component $I_{dc}$ of the resulting current.

Figure 1B:
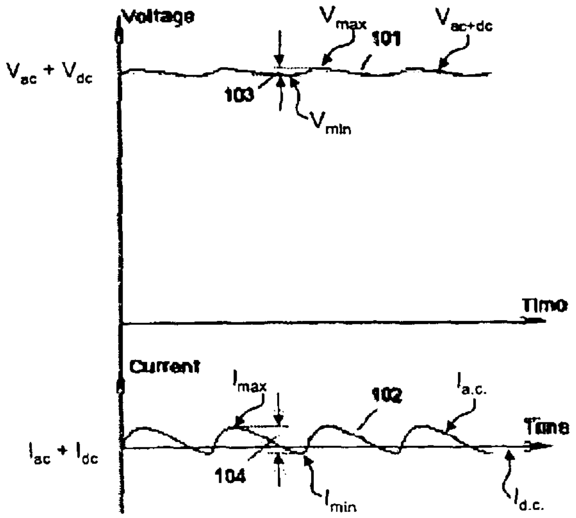
FIG. 1B is a waveform of a power supply output separately depicting voltage and current amplitudes over time.

The operation of device 100 may be described with reference to the timing diagram of FIG. 1B. When the ionization current reaches some maximum amplitude ($I_{max}$), ions are emitted from the corona discharge electrode so as to charge ambient molecules and particles of the fluid (i.e., air molecules). At this time maximum power is generated and maximum ozone production (in air or oxygen) occurs. When the current decreases to $I_{min}$, less power is generated and virtually no ozone is produced.

At the same time, charged molecules and particles are accelerated toward the opposite electrode (the attractor electrode) with the same force (since the voltage remains essentially constant) as in the maximum current condition. Thus, the fluid acceleration rate is not substantially affected and not to the same degree as the ozone production is reduced.

Acceleration of the ambient fluid results from the moment of ions forming the corona discharge electrodes to the attractor electrode. This is because under the influence of voltage 101, ions are emitted from the corona discharge electrode and create an "ion cloud" surrounding the corona discharge electrode. This ion cloud moves toward the opposite attractor electrode in response to the electric field strength, the intensity of which is proportional to the value of the applied voltage 101. The power supplied by power supply 105 is approximately proportional to the output current 102 (assuming voltage 101 is maintained substantially constant). Thus, the pulsated nature of current 102 results in less energy consumption than a pure d.c. current of the same amplitude. Such current waveform and relationship between a.c. and d.c. components of the current is ensured by having a low internal resistance 106 and small amplitude alternating component 103 of the output voltage. It has been experimentally determined that most efficient electrostatic fluid acceleration is achieved when relative amplitude of the current 102 alternating component (i.e., $I_{ac}/I_{dc}$) is greater than the relative amplitude of voltage 101 alternating component (i.e., $V_{ac}/V_{dc}$). Further, as these ratios diverge, additional improvement is realized. Thus, if $V_{ac}/V_{dc}$ is considerably less than (i.e., no more than half) and, preferably, no more than 1/10, 1/100, or, even more preferably, 1/1000 that of $I_{ac}/I_{dc}$, (wherein $V_{ac}$ and $I_{ac}$ are similarly measured, e.g., both are RMS, peak-to-peak, or similar values) additional efficiency of fluid acceleration is achieved. Mathematically stated a different way, the product of the constant component of the corona current and the time-varying component of the applied voltage divided by the product of the time-varying component of the corona current and the constant component of the applied voltage should be minimized, each discrete step in magnitude for some initial steps providing significant improvements:

$$\frac{I_{dc}\times V_{ac}}{I_{ac}\times V_{dc}}\leq 1;\ .01;\ .001;\ .0001;\ \cdots$$

Figure 2A:
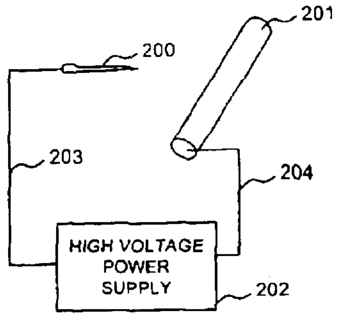
FIG. 2A is a schematic diagram of a corona discharge device having insufficient interelectrode capacitance to (i) optimize air flow, (ii) reduce power consumption and/or (iii) minimize ozone production.

FIG. 2A shows the corona discharge device that does not satisfy the above equations. It includes corona discharge electrode 200 in the shape of a needle, the sharp geometry of which provides the necessary electric field to produce a corona discharge in the vicinity of the pointed end of the needle. The opposing collector electrode 201 is much larger, in the form of a smooth bar. High voltage power supply 202 is connected to both of the electrodes through high voltage supply wires 203 and 204. However, because of the relative orientation of discharge electrode 200 perpendicular to a central axis of collector electrode 201, this arrangement does not create any significant capacitance between the electrodes 200 and 201. Generally, any capacitance is directly proportional to the effective area facing between the electrodes. This area is very small in the device shown in the FIG. 2A since one of the electrodes is in the shape of a needle point having minimal cross-sectional area. Therefore, current flowing from the electrode 200 to the electrode 201 will not have a significant a.c. component. Corona discharge devices arrangements similar to that depicted in FIG. 2A demonstrate very low air accelerating capacity and comparatively substantial amount of ozone production.

Figure 2B:
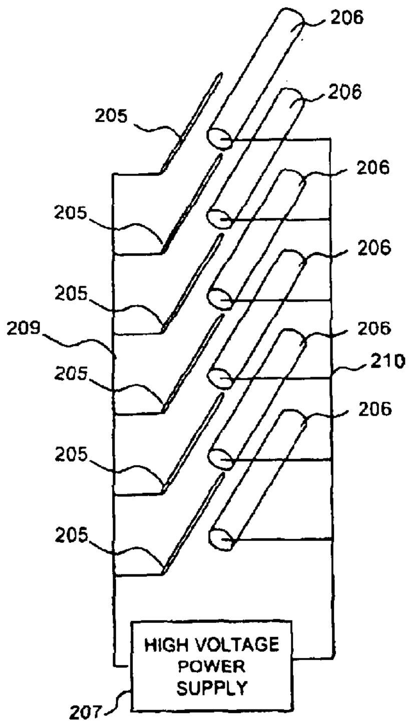
FIG. 2B is a schematic diagram of a corona discharge device optimized to benefit from and cooperate with a power supply such as that depicted in FIG. 3.
Figure 3:
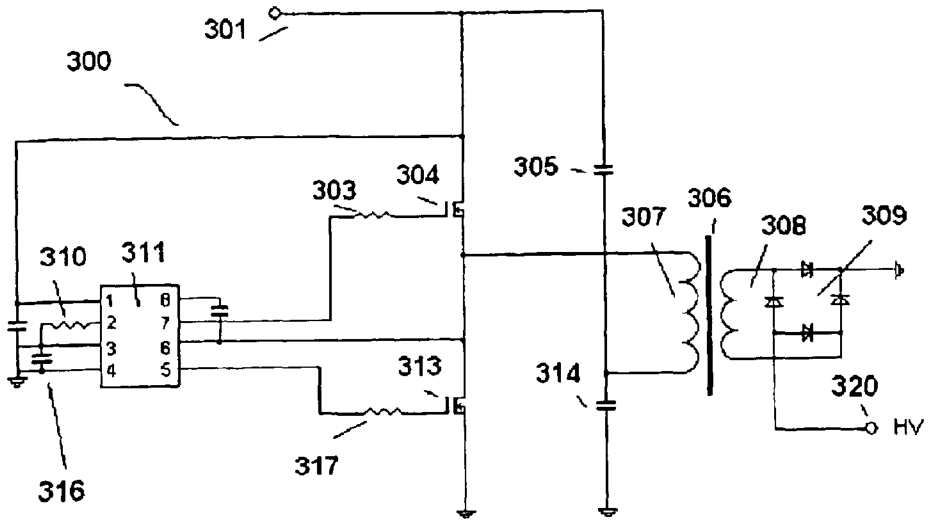
FIG. 3 is a schematic diagram of a power supply that produces a high amplitude d.c. voltage having low amplitude high frequency voltage ripples.

FIG. 2B shows an alternative corona discharge device. A plurality of corona discharge electrodes are in the shape of long thin corona discharge wires 205 with opposing collector electrodes 206 in the shape of much thicker bars that are parallel to corona wires 205. High voltage power supply 207 is connected to corona discharge wires 205 and collector electrode 206 by respective high voltage supply wires 209 and 210. This arrangement provides much greater area between the electrodes and, therefore creates much greater capacitance therebetween. Therefore, the current flowing from corona wires 205 to collector electrodes 206 will have a significant a.c. component, providing that high voltage power supply 207 has sufficient current supplying capacity. Corona discharge devices arrangements like shown in the FIG. 2B provide greater air accelerating capacity and comparatively small ozone production when powered by a high voltage power supply with substantial high frequency current ripples but small voltage ripples (i.e., alternating components). FIG. 3 is a schematic diagram of a high voltage power supply circuit 300 capable of generating a high voltage having small high frequency ripples. Power supply 300 includes high voltage dual-winding transformer 306 with primary winding 307 and secondary winding 308. Primary winding 307 is connected to a d.c. voltage source 301 through a half-bridge inverter (power transistors 304, 313 and capacitors 305, 314). Gate signal controller 311 produces control pulses at the gates of the transistors 304, 313 through resistors 303 and 317. An operating frequency of these pulses is determined by values selected for resistor 310 and capacitor 316. Secondary winding 308 of transformer 306 is connected to bridge voltage rectifier 309 including four high voltage high frequency power diodes. Power supply 300 generates a high voltage output between the terminal 320 and ground which is connected to the electrodes of corona discharge device.

Figure 4:
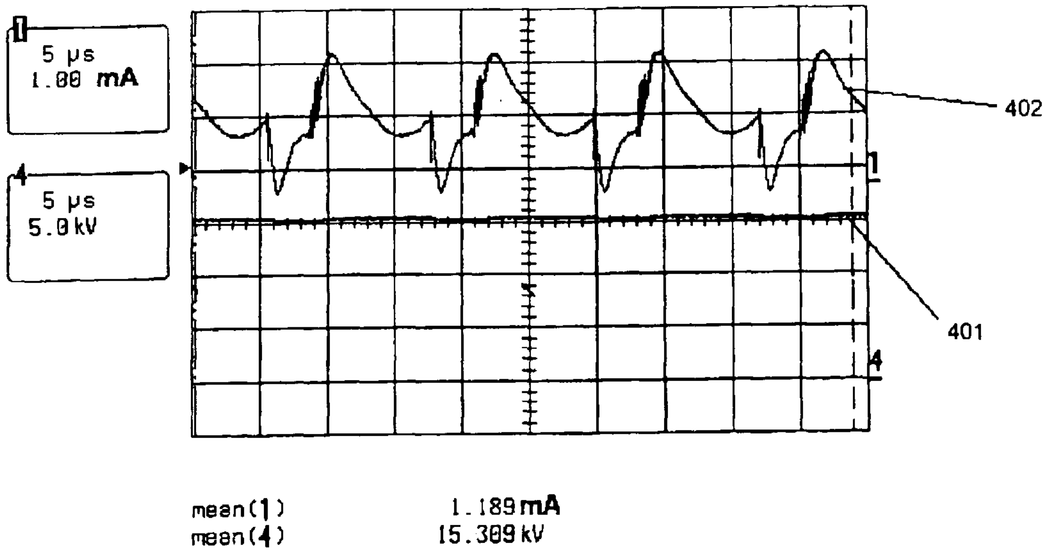
FIG. 4 is an oscilloscope trace of a high voltage applied to a corona discharge device and resultant corona current.

FIG. 4 depicts oscilloscope traces of the output current and voltage waveform, high voltage 401 at the corona discharge device and together with the resultant current 402 produced and flowing through the array of electrode. It can be seen that voltage 401 has a relatively constant amplitude of about 15,300 V with little or no alternating component. Current 402, on the other hand, has a relatively large alternating current component (ripples) in excess of 2 mA, far exceeding the current mean value (1.189 mA).

Measurements of system performance verify improved efficiency and enhanced removal and elimination of particulates present in air processed by the system. In particular, it has been found that systems employing various embodiments of the invention exhibit a dust collection efficiency exceeding 99.97% for the removal of dust particles of 0.1 μm and larger. Thus, the system ensures that most particles achieve some maximum charge, i.e., no further charges (e.g., ion) may be associated with each particle. This leads to the conclusion that the corona technology according to embodiments of the invention is functional to fully charge all particles of interest such that any increase in current would not further enhance system performance, particularly when the system is primarily used for air cleaning versus general fluid acceleration and control.

It has further been determined that the various embodiments of the invention operate efficiently regardless of relationship of the applied high voltage to the ground. For example, in one case the corona electrodes may be connected to, for example, positive high voltage potential while the corresponding collector electrodes are connected to the ground. In another embodiment the corona electrodes may be connected to ground while the collecting electrodes are connected to a high negative potential without affecting efficiency of the resultant device. Thus, for example, the embodiment depicted in FIG. 1B includes corona electrodes connected to a high positive voltage while the corona electrodes of the embodiment depicted in FIG. 3 are connected to a negative voltage. Thus, the relevant consideration is the relative potential difference applied between the corona and collecting electrodes instead of the voltage difference of either relative to an arbitrary or fixed ground potential. Various embodiments of the invention include configurations wherein the corona electrode, the collecting electrode, or neither electrode is maintained at or close to ground potential (i.e., within ±50 V, preferably within ±10 V and more preferably within ±5 V of ground potential, ground potential being a reference typically considered to be 0 V).

It has been found that preferred embodiments of the invention exhibit enhanced efficiency when high voltage and current ripples are in at least the ultrasonic frequency, i.e. when the frequency of alternating (i.e., a.c.) components of the corona voltage ($V_{a.c.}$) and current ($I_{a.c.}$) are well in excess of 20 kHz. The advantages include at least two factors. A first factor takes into consideration acoustic noise generated by devices operating at audible or near-audible frequencies. That is, even ultrasonic frequencies can disturb and distress pets which are often capable of hearing such high frequency (i.e., super-sonic to humans) sounds. A second factor considers operating frequency in comparison to the distance traveled by particles passing through an electrostatic air cleaning device according to embodiments of the invention. That is, based on a relatively high fluid (e.g., air) velocity, fluid (e.g. air) molecules and particles present therein may pass most or all important portions of collection elements (e.g., the front parts or leading edges of the collecting electrodes) without being fully charged if the ripples frequency is low. Accordingly, this again dictates use of some minimum frequency for voltage or current varying (e.g., alternating or pulsed) components of the device operating voltage and current. In particular, it has been determined that such varying (e.g., a.c.) components should have a frequency that is at least ultrasonic, and, in particular above, 20–25 kHz and, more preferably, having a frequency in the 50+ kHz range. The frequency characteristic may also be defined such that a combination of the main frequency and an amplitude level thereof minimizes the generation of undesirable sounds to an imperceivable or imperceptible level, e.g., is inaudible to humans and/or animals, i.e., requires that the alternating component of the voltage $V_{a.c.}$ have a main frequency well in excess of an audible sound level.

In summary, the present invention includes embodiments in which a low inertia power supply is combined with an array of corona discharge elements presenting a highly reactive load to the power supply. That is, the capacitive loading of the array greatly exceeds any reactive component in the output of the power supply. This relationship provides a constant, low ripple voltage and a high ripple current. The result is on a highly efficient electrostatic fluid accelerator with reduced ozone production.

It should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A device for handling a fluid comprising:

a corona discharge device including at least one corona discharge electrode and at least one collector electrode; and an electric power supply connected to said corona discharge and collector electrodes to supply an electric power signal by applying a voltage $V_t$ between said electrodes so as to cause a corona current $I_t$ to flow between said corona discharge and collector electrodes, both said voltage $V_t$ and corona current $I_t$ each being a sum of respective constant d.c. and alternating a.c. components superimposed on each other whereby $V_t=V_{d.c.}+V_{a.c.}$ and $I_t=I_{d.c.}+I_{a.c.}$, a current ripple value $I_{a.c.}/I_{d.c.}$ related to a voltage ripple value $V_{a.c.}/V_{d.c.}$ as $$\frac{I_{a.c.}}{I_{d.c.}} = \frac{C \cdot V_{a.c.}}{V_{d.c.}}$$

wherein $C \geqq 2$.

2. The device according to claim 1 wherein $C \geqq 10$.

3. The device according to claim 1 wherein $C \geqq 100$.

4. The device according to claim 1 wherein $C \geqq 1000$.

5. The device according to claim 1 wherein a frequency of said alternating component of said voltage $V_{a.c.}$ has a main frequency well in excess of an audible sound level.

6. The device according to claim 1 wherein a frequency of said alternating component of said voltage $V_{a.c.}$ is in a range above 30 kHz.

7. The device according to claim 1 wherein a frequency of said alternating component of said voltage $V_{a.c.}$ is in a range of 50 kHz to 1 MHz.

8. The device according to claim 1 wherein a frequency of said alternating component of said voltage $V_{a.c.}$ is approximately 100 kHz.

9. The device according to claim 1 wherein said amplitude of said constant component of said voltage of said electric power signal is within a range of 10 kV to 25 kV.

10. The device according to claim 1 wherein said amplitude of said constant component of said voltage $V_{d.c.}$ is greater than 1 kV.

11. The device according to claim 1 wherein said amplitude of said constant component of said voltage $V_{d.c.}$ of said electric power signal is approximately 18 kV.

12. The device according to claim 1 wherein:

said amplitude of said alternating component of said corona current $I_{a.c.}$ of said electric power signal is no more than 10 times greater than said amplitude of said constant current component $I_{d.c.}$ of said electric power signal; and said amplitude of said constant current component $I_{d.c.}$ of said electric power signal is no more than 10 times greater than said amplitude of said alternating component $I_{a.c.}$ of said corona current of said electric power signal.

13. The device according to claim 1 wherein said amplitude of an alternating component of said voltage $V_{a.c.}$ of said electric power signal is no greater than one-tenth of said amplitude of said constant component of said voltage $V_{d.c.}$.

14. The device according to claim 1 wherein said amplitude of said alternating component of said voltage of said electric power signal $V_{a.c.}$ is no more than 1 kV.

15. The device according to claim 1 wherein said constant component of said corona current $I_{d.c.}$ is at least 100 μA.

16. The device according to claim 1 wherein said constant component of said corona current $I_{d.c.}$ is at least 1 mA.

17. The device according to claim 1 wherein a reactive capacitance between said corona discharge electrodes has a capacitive impedance that corresponds a highest harmonic of a frequency of said alternating component of said voltage that is no greater than 10 MΩ.

18. The device according to claim 1 wherein the potential of the corona electrode is close to a ground potential.

19. The device according to claim 18 wherein the potential of the corona discharge electrode is within ±50 V of said ground potential.

20. The device according to claim 1 wherein the potential of the collecting electrode is close to a ground potential.

21. The device according to claim 20 wherein the potential of the collecting electrode is within ±50 V of said ground potential.

22. The device according to claim 1 wherein the potential of neither said corona discharge electrode nor said collecting electrode is close to a ground potential.

23. The device according to claim 22 wherein the potentials of both said corona discharge electrode and said collecting electrode are at least 10 V different from said ground potential.

24. The device according to claim 23 wherein the potentials of both said corona discharge electrode and said collecting electrode are at least 50 V different from said ground potential.

25. A device for handling a fluid comprising:

a corona discharge device including at least one corona discharge electrode and at least one collector electrode; and an electric power supply connected to said corona discharge and collector electrodes to supply an electric power signal by applying a voltage $V_t$ between said electrodes so as to cause a corona current $I_t$ to flow between said corona discharge and collector electrodes, both said voltage $V_t$ and corona current $I_t$ each being a sum of respective constant d.c. and alternating a.c. components superimposed on each other whereby $V_t=V_{d.c.}+V_{a.c.}$ and $I_t=I_{d.c.}+I_{a.c.}$, wherein $V_{a.c.} \ll V_{d.c.}$ and $I_{a.c.} \sim I_{d.c.}$.

26. A device for handling a fluid comprising:

a corona discharge device including at least one corona discharge electrode and at least one collector electrode; and an electric power supply connected to said corona discharge and collector electrodes to supply an electric power signal by applying a voltage $V_t$ between said electrodes so as to cause a corona current $I_t$ to flow between said corona discharge and collector electrodes, both said voltage $V_t$ and corona current $I_t$ each being a sum of respective constant d.c. and alternating a.c.

components superimposed on each other whereby $V_t=V_{d.c.}+V_{a.c.}$ and $I_t=I_{d.c.}+I_{a.c.}$, wherein $V_{a.c.}<V_{d.c.}$ and $I_{a.c.}>I_{d.c.}$.

27. A method of handling a fluid comprising:

introducing the fluid to a corona discharge device including at least one corona discharge electrode and at least one collector electrode positioned proximate said corona discharge electrode so as to provide a total inter-electrode capacitance within a predetermined range; and supplying an electric power signal to said corona discharge device by applying a voltage $V_t$ between said corona discharge and collector electrodes so as to induce a corona current $I_t$ to flow between said electrodes, both said voltage $V_t$ and corona current $I_t$ each being a sum of respective constant d.c. and alternating a.c. components superimposed on each other whereby $V_t=V_{a.c.}+V_{a.c.}$ and $I_t=I_{d.c.}+I_{a.c.}$, a current ripple value $I_{a.c.}/_{d.c.}$ related to a voltage ripple value $V_{a.c.}/V_{d.c.}$ as $$\frac{I_{a.c.}}{I_{d.c.}} = \frac{C \cdot V_{a.c.}}{V_{d.c.}}$$

wherein $C \geqq 2$.

28. The method according to claim 27 wherein $C \geqq 10$.

29. The method according to claim 27 wherein $C \geqq 100$.

30. The method according to claim 27 wherein $C \geqq 1000$.

31. The method according to claim 27 further comprising a step of supplying said power signal to have an alternating component of said voltage $V_{a.c.}$ with a main frequency well in excess of an audible sound level.

32. The method according to claim 27 further comprising a step of supplying said power signal to have a frequency of said alternating component of said corona current is in the range above 30 kHz.

33. The method according to claim 27 wherein a frequency of said alternating component of said voltage is in a range of 50 kHz to 1 MHz.

34. The method according to claim 27 wherein a frequency of said alternating component of said voltage is approximately 100 kHz.

35. The method according to claim 27 wherein said amplitude of said constant component of said voltage $V_{d.c.}$ is within a range of 10 kV to 25 kV.

36. The method according to claim 27 wherein said amplitude of said constant component of said voltage $V_{d.c.}$ is greater than 1 kV.

37. The method according to claim 27 wherein said amplitude of said constant component of said voltage $V_{d.c.}$ is approximately 18 kV.

38. The method according to claim 27 wherein:

said amplitude of said alternating component of said corona current $I_{a.c.}$ is no more than 10 times greater than said amplitude of said constant component of said corona current $I_{d.c.}$; and said amplitude of said constant component of said corona current $I_{d.c.}$ is no more than 10 times greater than said amplitude of said alternating component of said corona current $I_{a.c.}$.

39. The method according to claim 27 wherein said amplitude of said alternating component of said voltage $V_{a.c.}$ is no greater than one-tenth of said amplitude of said constant component of said voltage $V_{d.c.}$.

40. The method according to claim 27 wherein said amplitude of said alternating component of said voltage $V_{a.c.}$ of said electric power signal is no greater than 1 kV.

41. The method according to claim 27 wherein said constant component of said corona current $I_{d.c.}$ is at least 100 $\mu$A.

42. The method according to claim 27 wherein said constant component of said corona current $I_{d.c.}$ is at least 1 mA.

43. The method according to claim 27 wherein a reactive capacitance between said corona discharge electrodes and said collector electrodes has a capacitive impedance that corresponds to a highest harmonic of a frequency of said alternating component of said voltage and is no greater than 10 MΩ.

44. A method of handling a fluid comprising:

introducing the fluid to a corona discharge device including at least one corona discharge electrode and at least one collector electrode positioned proximate said corona discharge electrode so as to provide a total inter-electrode capacitance within a predetermined range; and supplying an electric power signal to said corona discharge device by applying a voltage $V_t$ between said corona discharge and collector electrodes so as to induce a corona current $I_t$ to flow between said electrodes, both said voltage $V_t$ and corona current $I_t$ each being a sum of respective constant d.c. and alternating a.c. components superimposed on each other whereby $V_t=V_{d.c.}+V_{a.c.}$ and $I_t=I_{d.c.}+I_{a.c.}$, and wherein $V_{a.c.}<<V_{d.c.}$ and $I_{a.c.}\sim I_{d.c.}$.

45. A method of handling a fluid comprising:

introducing the fluid to a corona discharge device including at least one corona discharge electrode and at least one collector electrode positioned proximate said corona discharge electrode so as to provide a total inter-electrode capacitance within a predetermined range; and supplying an electric power signal to said corona discharge device by applying a voltage $V_t$ between said corona discharge and collector electrodes so as to induce a corona current $I_t$ to flow between said electrodes, both said voltage $V_t$ and corona current $I_t$ each being a sum of respective constant d.c. and alternating a.c. components superimposed on each other whereby $V_t=V_{d.c.}+V_{a.c.}$ and $I_t=I_{d.c.}+I_{a.c.}$, and wherein $V_{a.c.}<V_{d.c.}$ and $I_{a.c.}>I_{d.c.}$.

* * * * *